W. HEAVISIDE.
ELECTRIC IRON.
APPLICATION FILED DEC. 26, 1911.

1,031,443.

Patented July 2, 1912.

Witnesses
W. S. McDowell
A. B. Cavanagh

Inventor
William Heaviside
By Victor J. Evans
Attorney

UNITED STATES PATENT OFFICE.

WILLIAM HEAVISIDE, OF DAVIS, CALIFORNIA.

ELECTRIC IRON.

1,031,443.  Specification of Letters Patent.  Patented July 2, 1912.

Application filed December 26, 1911. Serial No. 667,834.

*To all whom it may concern:*

Be it known that I, WILLIAM HEAVISIDE, a citizen of the United States, residing at Davis, in the county of Yolo and State of California, have invented new and useful Improvements in Electric Irons, of which the following is a specification.

This invention relates to certain novel and useful improvements in electric irons, and has particular application to the construction of the shell or body portion of the iron which is designed to contain the heating unit, such as a resistance grid or the like.

In carrying out my invention, it is my purpose to provide an iron having a base portion upon which is adapted to rest the heating unit, said unit being surrounded by a vacuum shell to which is connected the handle for using the iron.

A further object of the invention is to provide a simple, compact, cheap and efficient form of electric iron which may be readily and quickly attached to any source of electrical supply, such as the ordinary electric socket, and, furthermore, by forming my shell of a plurality of spaced walls forming a vacuum chamber, I provide a structure whereby the heat is prevented from excessively heating the handle carried by the shell.

With the above-recited objects, and others of a similar nature in view, the invention consists in the construction, combination and arrangement of parts, set forth in and falling within the scope of the appended claim.

Figure 1:
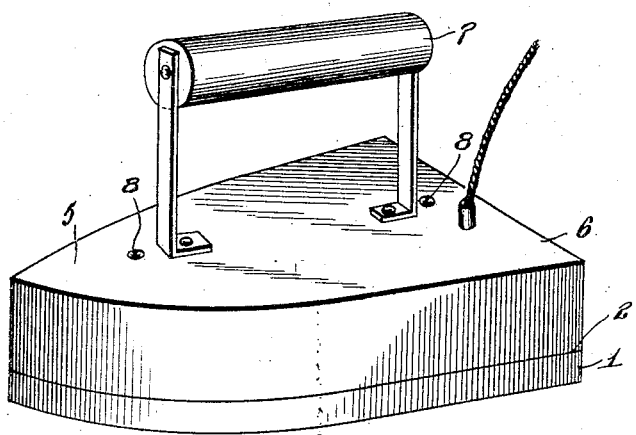
Figure 2:
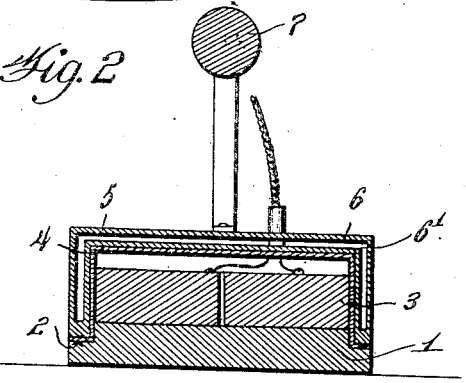
Figure 3:
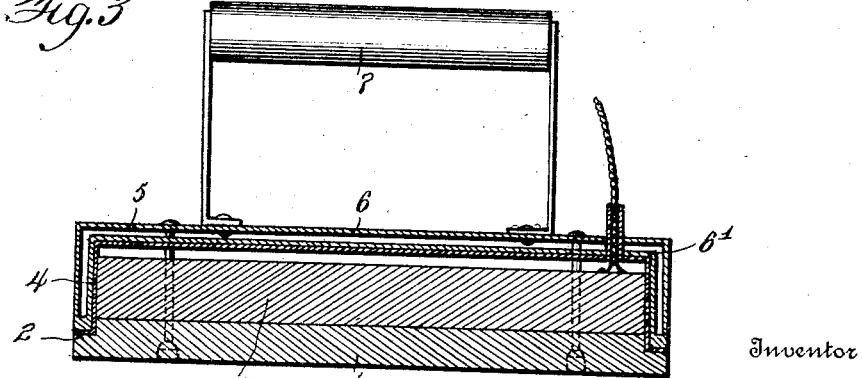

In the drawings:—Figure 1 is a perspective view of an iron embodying my invention. Fig. 2 is a transverse vertical sectional view taken through the same. Fig. 3 is a vertical longitudinal sectional view.

Referring now to the accompanying drawings in detail, the numeral 1 indicates the iron base which is of the usual form and shape and has formed entirely around the edge thereof a shoulder or flange 2. Upon this base is adapted to be mounted an electric resistance grid or heating unit 3, while 4 indicates a sheet or packing of asbestos which is adapted to overlie the heating unit, or to be interposed between said heating unit and the casing or shell 5. This shell as will be seen by reference to Figs. 2 and 3 is formed of the two walls 6—6' suitably spaced apart and from which space the air is withdrawn so that the walls form a vacuum chamber. This chamber which is of the contour of the base is adapted to seat thereon so that the edges of the vacuum chamber rest upon the flange extending around such base.

Upon the upper face of the vacuum chamber is mounted the ordinary handle 7. The vacuum chamber is secured to the base through the medium of suitable fastening bolts or rivets 8—8.

It will be seen that I have provided an exceedingly simple yet efficient form of electric iron, especially adapted for ordinary household use; the peculiar formation and arrangement of the vacuum chamber preventing the shell or chamber being heated to an excessive degree and such heat being imparted to the handle.

I claim:—

An electric iron comprising a base having a flange extending around the edge thereof, an electric heating element mounted on said base, an asbestos packing mounted above the heating element, a vacuum chamber formed of a plurality of spaced walls mounted upon the base with its lower edges resting on the flange, and a handle for the iron.

In testimony whereof I affix my signature in presence of two witnesses.

WILLIAM HEAVISIDE.

Witnesses:
A. C. BEALL,
EDW. S. NORTON.